United States Patent
Schulter et al.

(10) Patent No.: US 12,021,999 B2
(45) Date of Patent: Jun. 25, 2024

(54) DEVICES AND METHODS FOR THE GENERATING AND AUTHENTICATION OF AT LEAST ONE DATA PACKET TO BE TRANSMITTED IN A BUS SYSTEM (BU), IN PARTICULAR OF A MOTOR VEHICLE

(71) Applicant: Conti Temic microelectronic GmbH, Nuremberg (DE)

(72) Inventors: Wolfgang Schulter, Meersburg (DE); Wolfgang Schrempp, Immenstaad (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 314 days.

(21) Appl. No.: 17/599,676

(22) PCT Filed: Mar. 26, 2020

(86) PCT No.: PCT/EP2020/058542
§ 371 (c)(1),
(2) Date: Sep. 29, 2021

(87) PCT Pub. No.: WO2020/201010
PCT Pub. Date: Oct. 8, 2020

(65) Prior Publication Data
US 2022/0191040 A1 Jun. 16, 2022

(30) Foreign Application Priority Data
Apr. 1, 2019 (DE) ..................... 10 2019 204 608.8

(51) Int. Cl.
*H04L 9/32* (2006.01)
*H04L 12/40* (2006.01)

(52) U.S. Cl.
CPC ............ *H04L 9/3242* (2013.01); *H04L 12/40* (2013.01); *H04L 2012/40273* (2013.01); *H04L 2209/84* (2013.01)

(58) Field of Classification Search
CPC .................. H04L 9/3242; H04L 12/40; H04L 2012/40273; H04L 2209/84; H04L 9/12;
(Continued)

(56) References Cited

U.S. PATENT DOCUMENTS 10,243,732 B1 * 3/2019 Herzerg ................ H04L 9/0819
2017/0104581 A1 * 4/2017 Hars ..................... H04L 9/0631
(Continued)

FOREIGN PATENT DOCUMENTS

CN 1964257 A 5/2007
CN 108696411 A 10/2018
(Continued)

OTHER PUBLICATIONS

Office Action dated Dec. 13, 2019 from corresponding German Patent Application No. DE 10 2019 204 608.8.
(Continued)

*Primary Examiner* — Henry Tsang (57) ABSTRACT

Disclosed are an apparatus and a method for generating at least one data packet to be transmitted in a bus system of a motor vehicle, wherein before transmitting the at least one data packet comprising the message to be included in the data packet a bus subscriber transmitting the data packet uses a first encryption apparatus to generate a message authentication code that is likewise to be included in the data packet by using a first encryption method to generate an encrypted message code from the message with a first key, using a second encryption method to generate an encrypted count from a count by means of a second key, and using a logic operation to generate the message authentication code to be transmitted from the encrypted message code and from the encrypted count, and an apparatus and a method for authentication checking such data packets at the receiver.

10 Claims, 5 Drawing Sheets

(58) Field of Classification Search
CPC ......... H04L 2012/40215; H04L 63/123; H04L 63/1466
See application file for complete search history.

(56) References Cited

U.S. PATENT DOCUMENTS

| | | | |
|---|---|---|---|
| 2018/0131522 A1* | 5/2018 | Lawlis | .................. H04L 9/0631 |
| 2019/0109716 A1* | 4/2019 | Mizoguchi | ............ H04L 9/3242 |

FOREIGN PATENT DOCUMENTS

| | | |
|---|---|---|
| DE | 102014113111 A1 | 3/2015 |
| DE | 102015015361 A1 | 5/2016 |
| DE | 102017125826 A1 | 5/2018 |
| EP | 3432511 A1 | 1/2019 |

OTHER PUBLICATIONS

International Search Report and Written Opinion dated May 18, 2020 from corresponding International Patent Application No. PCT/EP2020/058542.

Yang et al. "The Simeck Family of Lightweight Block Ciphers", 2015, Springer-Verlag, Jun. 2015.

Werner Zimmermann et al. "Bussysteme in der Fahrzeugtechnik", 2011, pp. 45-49 and 63-65, Praxis, Viewig & Teubner, ATZ.

"Specification of Secure Onboard Communication", Autosar, 2000, Autosar CP Release 4.3.1; Document ID 654: AUTOSAR_SWS_SecureOnboardCommunication.

Wikipedia "Message Authentication Code", 2019, https://de.wikipedia.org/w/windex.php?title=Message_Authentication_Code&oldid=184370514.

Bruce Schneier "Angewandte Kryptographie", Protokolle, Algorithnen und Sourcecode in C, 1 Auflage, Addison-Wesley, Seite 67, 1996.

Office Action dated Nov. 29, 2023 from corresponding Chinese patent application No. 202080026594.7.

* cited by examiner

M = 4, F = 1, N = 3, Authenticator: AES-128,
Key = 0x2b7e151628aed2a6abf7158809cf4f3c

| | MSG | Count = FV | MAC | TFV,CMAC |
|---|---|---|---|---|
| DP1: | 0x00000000 | 0x00000000 | 0x7df76b0c1ab899b3 3e42f047b91b546f | 0x007df76b |
| DP2: | 0x00000000 | 0x00000001 | 0x57127d4034b1bebf aef466b9c7726fc6 | 0x0157127d |
| DP3: | 0x00000000 | 0x00000100 | 0xa0733521fefc4ce22 b1981d3ec0df91c | 0x00a07335 |
| DP4: | 0x00000000 | 0x00000101 | 0x82f46d70b372b9b2 26db1e6142f19a80 | 0x0182f46d |

FIG 5

M = 4, N = 4, BC1: AES-128, BC2: SIMECK32 [3]
K1 = 0x2b7e151628aed2a6abf7158809cf4f3c
K2 = 0x191811100908010O

| | MSG | CMAC1 | Count++ | CIPH | CMAC |
|---|---|---|---|---|---|
| DP1: | 0x00000000 | 0x0c6bf77d | 0x00000000 | 0x20d44f0 | 0x2cb6b38d |
| DP2: | 0x00000000 | 0x0c6bf77d | 0x00000001 | 0x2b3ec7e7 | 0x2755309a |
| DP3: | 0x00000000 | 0x0c6bf77d | 0x00000100 | 0x8a48dfef | 0x86232892 |
| DP4: | 0x00000000 | 0x0c6bf77d | 0x00000101 | 0x1a54d0ef | 0x163f2792 |

DEVICES AND METHODS FOR THE GENERATING AND AUTHENTICATION OF AT LEAST ONE DATA PACKET TO BE TRANSMITTED IN A BUS SYSTEM (BU), IN PARTICULAR OF A MOTOR VEHICLE

The invention relates to apparatuses and methods for generating (at the transmitter) and authentication checking (at the receiver) at least one data packet to be transmitted in a bus system (BU), in particular of a motor vehicle.

The following publications relate to the secure transmission of messages:

[1] W. Zimmermann, R. Schmidgal Bussysteme in der Fahrzeugtechnik [Bus systems in vehicle engineering], 4th edition, Vieweg+Teubner 2011

[2] AUTOSAR Specification of Secure Onboard Communication, Release 4.3.1, www.autosar.com

[3] Yang, G., Zhu, B., Suder, V., Aagaard, M D, Gong, G: The SIMECK Family of Block Ciphers, In Cryptographic Hardware and Embedded Systems-CHES 2011 (pp. 342-357). 2015 Springer Berlin Heidelberg. pdf at eprint.iacr.org Message authentication codes "MAC" can be used to ensure the integrity of a transmitted message, similarly to a checksum. In the case of an encrypted MAC (that is to say CMAC), this can be calculated, even at the receiver, only if a cryptographic key is known. A receiving bus subscriber that is likewise in possession of this key can thus check the content of a message for authenticity. The message itself is transmitted in unencrypted form together with a MAC or CMAC.

It is an object of the invention to efficiently implement secure communication in a bus system of a vehicle.

The object is achieved by the subject matter of each of the independent patent claims, specifically in particular at the transmitter and at the receiver, in each case as a method and an apparatus. Embodiments of the invention can efficiently allow secure communication in a network in a vehicle. The method can e.g. efficiently allow authentication of a replay-resistant transmitted message authentication code CMAC in the receiver of a data packet.

Some particularly advantageous embodiments of the invention are specified in the subclaims and the description.

According to embodiments of the invention, the count can be e.g. a value, generated using a counter, that e.g. represents the number of messages transmitted and/or received via the bus system hitherto, in particular since the last restart of the bus system, (which may be particularly easy to implement e.g. in software) or a timer value, of at least one timer, that is available in particular on multiple or all bus subscribers (which can increase security in particular when the same time/timer values are available on multiple bus subscribers).

According to embodiments according to the invention, an authentication check at the receiver can in particular use a threshold value when comparing a current received message count and a preceding received message count, said threshold value preferably being set to a higher value after a restart of the bus system than in other normal operation, which can optimize security depending on the situation.

The bus system, in particular a CAN bus or a CAN FD bus or a LIN bus or an SPI bus or an Ethernet bus, or an I2C bus, can be provided for communication between ECUs.

Further features and advantages of some advantageous embodiments of the invention will emerge from the description below of exemplary embodiments of the invention with reference to the drawing, in which, by way of example, to illustrate some possible embodiments of the invention, and in a simplified and schematic manner.

Figure 1:
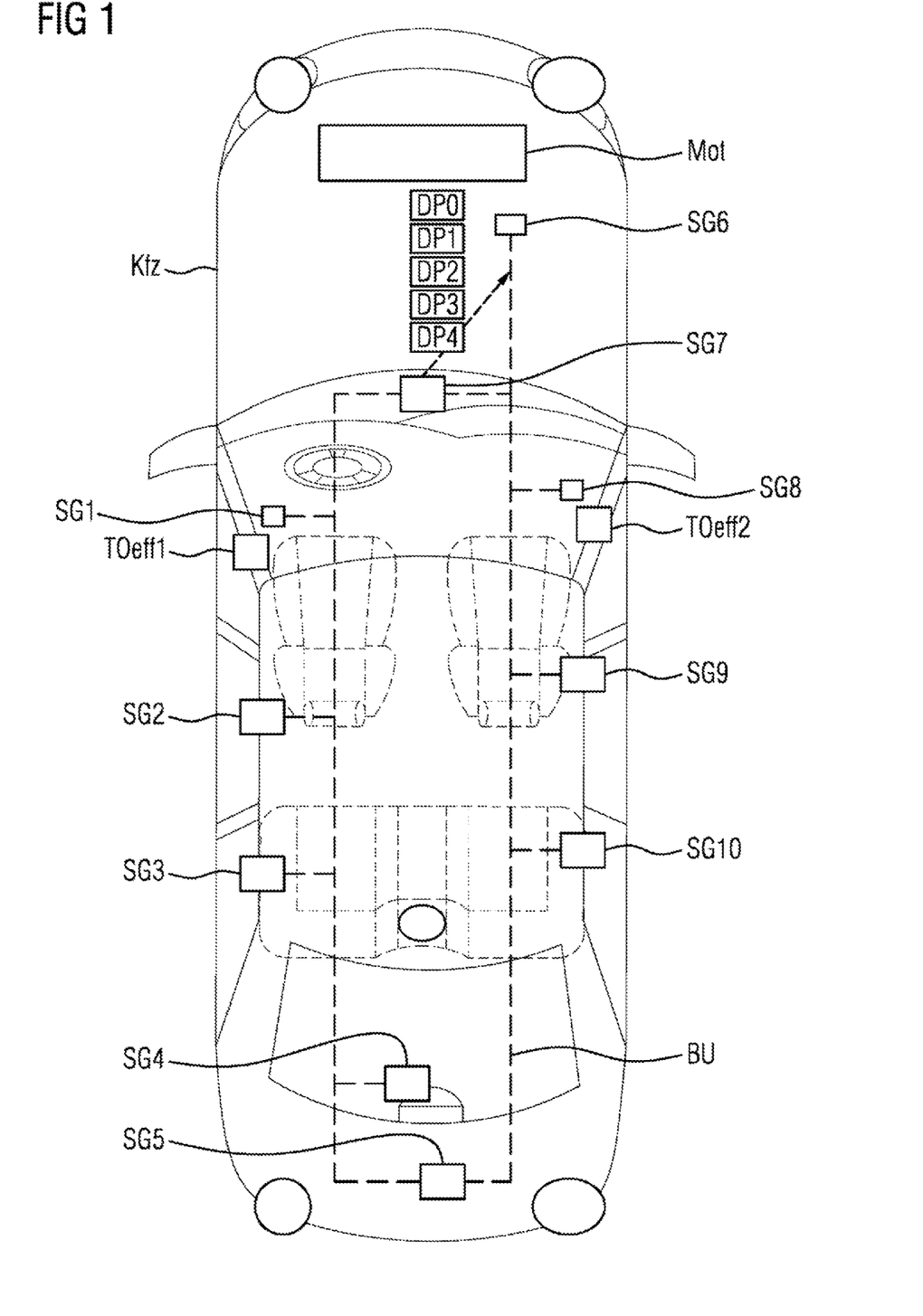
FIG. 1 shows a motor vehicle with a network according to the invention in the form of a bus system having multiple bus subscribers.

FIG. 1 schematically shows a simplified depiction, for some embodiments of the invention, of how, generally, data packets DP1, DP2, DP3, DP4 (e.g. in particular PDUs or Protocol Data Units or in particular, in a CAN bus, also frames, in particular data frames) are transmitted in a network (e.g. a bus BU, in particular a CAN bus and/or LIN bus and/or other bus system) in a motor vehicle Kfz (e.g. car or truck) from a bus subscriber SG7 transmitting the data packets DP1, DP2, DP3, DP4 to a bus subscriber SG6 of the bus system BU (having multiple bus subscribers/ECU SG1-SG10) receiving the data packets DP1, DP2, DP3, DP4, which data packets DP1, DP2, DP3, DP4 can be used e.g. to control a motor Mot or door opener TOeff1, Toeff2 (connected to a bus subscriber) or to transmit data from a sensor, etc.

The structure of data packets DP1, DP2, DP3, DP4 is described by way of illustration for an example of a network in the form of a CAN bus in de.wikipedia.org/wiki/Controller Area Network.

Figure 2:
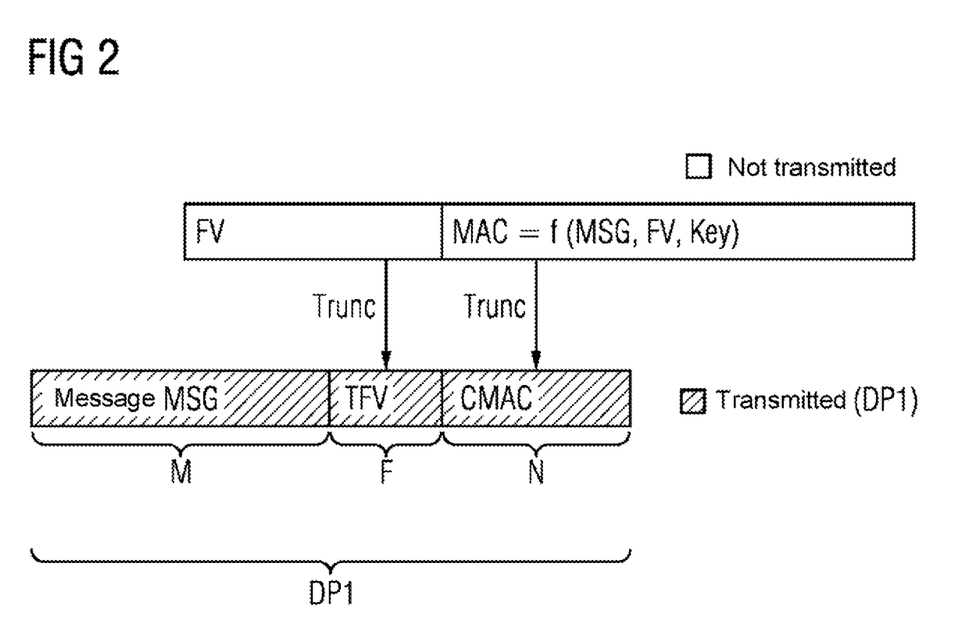
FIG. 2 shows the structure of a data packet to be transmitted that can generally be used in a conventional bus system, and the generation of parts of the data packet.

FIG. 2 provides a general and simplified illustration of the use of message authentication codes (MAC) (transmitted in shortened form as CMAC) by a transmitting bus subscriber SG7 to ensure the integrity of a transmitted data packet DP1, DP2, DP3, e.g. similarly to a checksum, that is to say to allow authentication checking of the transmitted data data packets DP1, DP2, DP3, DP4 at their receiving bus subscriber SG6.

A message authentication code (MAC, known e.g. from de.wikipedia.org/wiki/Message Authentication Code) is generated from the message MSG (that is to say e.g. the user data to be transmitted and/or the DATA field in a data packet) having the length M bytes (byte e.g. comprising 8 bits each; M e.g. =8), namely using an (e.g. symmetrical) encryption method f (e.g. AES-128) using a secret key KEY (known to the transmitting bus subscriber SG7 and the receiving bus subscriber SG6) and a freshness value FV (e.g. in the form of a (message) counter or time stamp), that is to say in simplified form:

$$MAC = f(MSG, FV, Key)$$

A transmitting bus subscriber SG7 transmits the following to a receiving bus subscriber SG6, e.g. in a data packet DP1 (or DP2 or DP3 or DP4 or DP0):

the (user data) message MSG of byte length M itself (e.g. In unencrypted form), and also a truncated (to the byte length F) (the reference sign for the truncation is Trunc) freshness value FV, referred to as truncated freshness value or TFV after truncation (e.g. in unencrypted form), and also a truncated (to the byte length N) (reference sign Trunc) message authentication code MAC (referred to as CMAC after this truncation).

M, F, N are natural numbers, e.g. in each case fixed values for all data packets.

A truncated (to the length N) transmitted message authentication code CMAC cannot be calculated without knowledge of the cryptographic key Key.

A receiving bus subscriber that is likewise in possession of this key Key can use the received truncated message authentication code CMAC to check the content of a message MSG for authenticity.

If data packets DG1, DG2, DG3 having the same message content MSG were to be repeatedly transmitted, the result would likewise always be the same message authentication code MAC and thus also the same shortened transmitted message authentication code CMAC.

In order to avoid such repetitions (replay attack), the message can contain a constantly changing value (truncated freshness value TFV), for example a sufficiently long counter (counter for the data packets DP1, DP2, DP3), time stamp (for the sending of a message) or random value FV, or truncated TFV.

A popular method of authentication is secure onboard communication (SecOC), which is described in the source mentioned at the outset [2] [Autosar] and is used e.g. for secure realtime communication in the vehicle via CAN.

The standard SecOC method according to [2] provides for the resource-efficient authentication of messages (PDUs) for critical data, and also for ensuring the freshness thereof in order to protect against replay attacks. Essentially symmetrical encryption is used for both the transmitting (TX-ECU, SG7 in FIG. 1) and the receiving RX-ECU (SG-6 in FIG. 1), here in particular the standard AES-128 algorithm. The classic CAN bus and the CAN-FD extension are in particular also suitable as communication media.

FIG. 2 shows a schematic representation according to [2] for generating an authentic message by means of a cryptographic authenticator function. In order to be robust against replay attacks, the freshness value FV must change with each transmission, even if the message MSG is invariable. FV is therefore e.g. often a monotonous counter with a sufficiently long word length, or a time stamp that represents the global time known to multiple or all bus subscribers. In this representation, both the freshness value and the calculated MAC are truncated for reasons of efficiency.

The classic CAN bus with a maximum of 8 bytes per message is often used as shown in FIG. 2, for example with lengths [M, F, N]=[4, 1, 3], so as not to exceed the maximum number of data bytes 8 (of a data packet DP1).

The truncation itself then requires the unshortened freshness values FV, that is to say longer monotonous counters or time stamps, in the receiving bus subscriber to be kept up to date or in sync with the transmitting bus subscriber, which can be quite problematic, for example during a start process (for the bus system). If the CMAC in the receiving bus subscriber is not equal to the transmitted value, the entire message is rejected as unauthentic.

Although the alternative option of doing without truncation altogether avoids problems with synchronism, this requires a higher bandwidth or transmission time on the bus.

Figure 3:
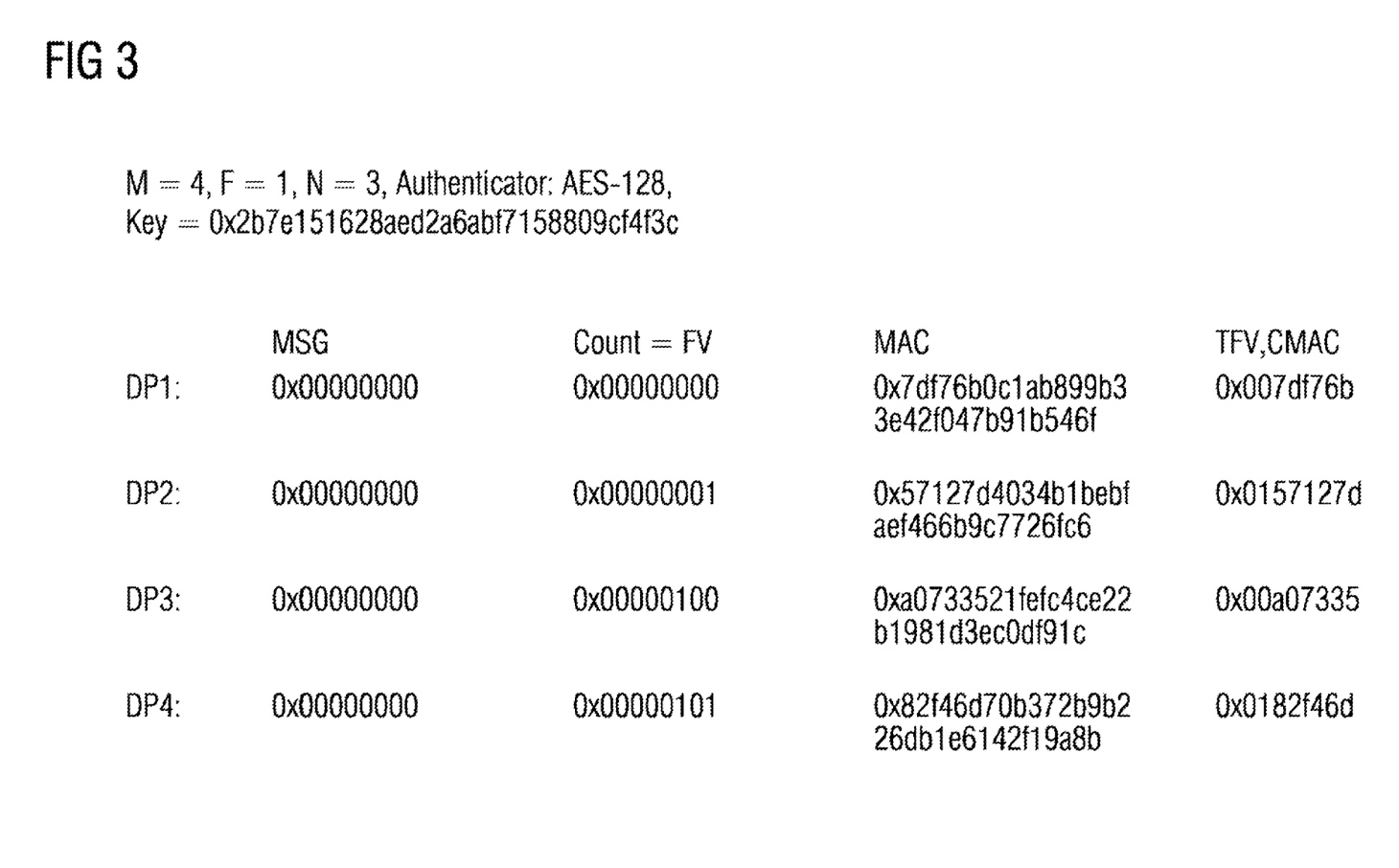
FIG. 3 shows possible values of messages and message authentication codes contained in each of four data packets in a conventional bus system, and also e.g. truncated freshness values transmitted in data packets.

FIG. 3 uses a table (copied here for the sake of simplicity) to show an example of a standard SecOC method with the following lengths for the parts of a data packet DP1 in bytes: M=4, F=1, N=3, and with an encryption method f (="Authenticator") in the form of AES-128, and also with a cryptographic key Key=0x2b7e151628aed2a6abf7158809cf4f3c.

| MSG | Count = FV | MAC | TFV, CMAC |
|---|---|---|---|
| 0x00000000 | 0x00000000 | 0x7df76b0c1ab899b33e42f047b91b546f | 0x007df76b |
| 0x00000000 | 0x00000001 | 0x57127d4034b1bebfaef466b9c7726fc6 | 0x0157127d |
| 0x00000000 | 0x00000100 | 0xa0733521fefc4ce22b1981d3ec0df91c | 0x00a07335 |
| 0x00000000 | 0x00000101 | 0x82f46d70b372b9b226db1e6142f19a8b | 0x0182f46d |

The transmitted message MSG is "0x00000000" in each case; the freshness values (e.g. counter of the number of the sent data packet DP1, DP2, DP3, DP4) FV and the message authentication codes (MAC) and the shortened message authentication codes CMAC are as shown.

The example in FIG. 3 shows different values of each of the shortened message authentication codes CMAC (with a length of N=3 bytes each) for the constant message MSG=0, which come to light as a result of the change in the freshness values FV (counter or time stamp).

This effectively prevents replay attacks, and authenticity is ensured by the knowledge of the secret key in the transmitting bus subscriber and in the receiving bus subscriber. As a result of the truncation, only the lower byte TFV is now transmitted (because F=1), which means that the information about the higher bytes of FV is ensured by additional synchronization.

In addition to a monotonous counter, a time stamp that e.g. encodes the global time, e.g. the number of seconds since Jan. 1, 2019, is also suitable as a freshness value. This resolution would be suitable for messages that are intended to be authenticated every second; the time stamp would overflow only after around 136 years.

Due to the frequency tolerances of popular oscillators, sufficient synchronism of the global time in the network must be ensured sufficiently often, even when time stamps are used, through additional communication.

Methods and apparatuses according to the invention show alternative approaches in this regard.

Exemplary embodiments of the invention are described below.

Figure 4:
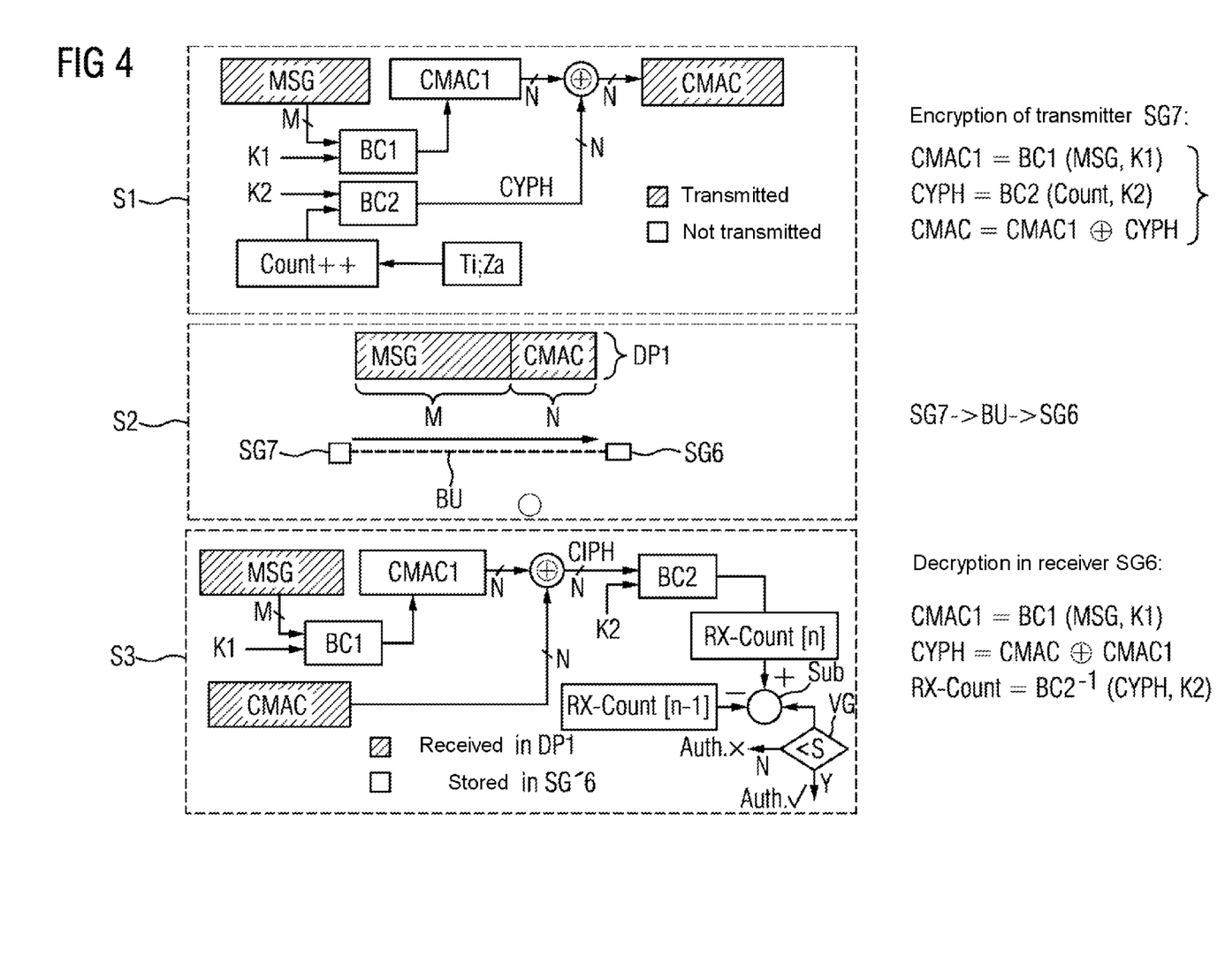
FIG. 4 shows steps and apparatuses of an exemplary embodiment according to the invention (at the transmitter and the receiver)

FIG. 4 shows, for some exemplary embodiments of the invention, how (in step S1) a transmitting bus subscriber SG7 (transmitting a data packet such as DP1) can, before transmitting, generate from the (user data) message MSG to be included in the data packet DP1 a message authentication code CMAC that is likewise to be included in the data packet DP1, how (in step S2) a network, in particular a (CAN etc.) bus system BU, can be used to transmit a data packet DP1 (containing in particular or only the message MSG and the message authentication code CMAC) from a (DP1, DP2, DP3, DP4 etc.) transmitting bus subscriber SG7 to a (DP1, DP2, DP3, DP4 etc.) receiving bus subscriber SG6, how (in step S3) a receiving bus subscriber SG6 (receiving a data packet such as DP1) can use the message MSG contained in the received data packet DP1 and the message authentication code CMAC (also contained in DP1) to perform an authentication check on the data packet DP1.

In step S1, a transmitting bus subscriber SG6 (transmitting a data packet such as DP1) generates, before transmitting, from the (user data) message MSG to be included in the data packet DP1 a message authentication code CMAC that is likewise to be included in the data packet DP1 by using a first encryption method (BC1) implemented in a first encryption apparatus BC1 to generate an encrypted message code CMAC1 from the message MSG by means of a first key K1, using a second encryption method (BC2) implemented in a second encryption apparatus BC2 to generate an encrypted count CYPH from a count Count++ (in particular a counter for transmitted/received messages DP1, DP2, DP3, DP4 or a timer value of a timer) by means of a second key K2, using an "Exclusive-Or" (=XOR) logic operation X to generate a message authentication code CMAC (to be transmitted via the bus system BU) from the encrypted message code CMAC1 and from the encrypted count CYPH using an (XOR) logic device X.

Formulae for the transmitting bus subscriber SG7 to clarify the encryption (before transmitting a data packet) can be e.g. the following:

$$CMAC1 = BC1(MSG, K1)$$

$$CYPH = BC2(Count, K2)$$

$$CMAC = CMAC1 \oplus CYPH$$

One embodiment of the invention can be implemented at the transmitter as a method or apparatus according to S1.

One embodiment of the invention can be implemented at the receiver as a method or apparatus according to S3.

One embodiment of the invention can also be implemented as a method or apparatus according to S1+S2+S3 in combination.

In step S1, generation of a replay-resistant CMAC in the transmitter is thus proposed. BC1 is e.g. a block cipher algorithm for generating a CMAC1 from a message MSG of length M bytes using a key K1. BC2 is e.g. a block cipher algorithm having a key K2 and a counter that increments with each transmission, having a block length N that is e.g. equal to the length of the CMAC1, that is to say e.g. N=4, BC1=AES, BC2=SIMECK.

In step S2, a network, in particular a (CAN etc.) bus system BU, is used to transmit the (one or else multiple) data packet DP1 thus generated (containing in particular or only the message MSG and the message authentication code CMAC) from a (DP1, DP2, DP3, DP4 etc.) transmitting bus subscriber SG6 to a (DP1, DP2, DP3, DP4 etc.) receiving bus subscriber SG6.

In step S3, a receiving bus subscriber SG6 (receiving a data packet such as DP1) can use the message MSG contained in the received data packet DP1 and the message authentication code CMAC (also contained in DP1) to perform the authentication check on the data packet DP1 using a further first encryption device BC1 (e.g. the same as the BC1 for the transmitter SG7), an XOR logic device X, a decryption device $BC2^{-1}$ (BC2 superscript minus one working inversely to the encryption device BC2) and a comparison apparatus VG (e.g. taking into account a threshold value of e.g. 1 or 2 or 3 or 4 or 5 or more for a count difference RX-Count [n]

minus RX-Count [n−1]).

Within step 3, the message MSG contained in the data packet DP1 received (by the receiving bus subscriber SG6) is used by the (further, e.g. working in the same way as BC1 for the transmitter) first encryption apparatus BC1 to generate an encrypted message code CMAC1 using the (secret, e.g. asymmetrical or symmetrical and/or same as that known for the transmitter SG7) key K1.

The message authentication code CMAC contained in the received data packet DP1 and the encrypted message code CMAC1 are used to generate the intermediate value CIPH using an (XOR) logic device X.

A decryption device $BC2^{-1}$ (BC2 superscript minus one is e.g. working inversely to the encryption device BC2) is used to generate from the intermediate value CIPH a current received message count RX-Count [n] (n=number of the currently received message DP1, that is to say n=1 here), from which a preceding received message count RX-Count [n−1] (n=number of the currently received message DP1, that is to say currently n=1) (accordingly determined for the data packet DP0 received before the data packet DP1) is subtracted using a subtraction device Sub.

The difference between the current received message count RX-Count [n] and the preceding received message count RX-Count [n−1] is compared with one or with a threshold value S by a comparison device VG, and if the difference is one or less than the threshold value S then the received data packet DP1 is defined as authenticated, but if the difference is greater than one or greater than the threshold value S then the received data packet DP1 is defined as unauthenticated.

Step S3 or the apparatuses in FIG. 4 below thus show a schematic representation for the authentication of a replay-resistant CMAC in the receiver SG6. BC1 is e.g. a block cipher algorithm for generating a CMAC1 from a message MSG using the key K1. BC2 is e.g. a block cipher algorithm having the key K2. The current reception counter RX-Count [n] is e.g. checked using the last received value RX-Count [n−1] for a tolerance range 0<RX-Count<S that is acceptable for authentication.

The threshold value S can e.g. be set to a higher value (e.g. S=2 ... 5) during or after the restart, in particular reboot (e.g. of the network/bus system BU), than in other normal operation (e.g. S=1).

The encryption device BC1 and the encryption device BC2 can in particular be different from one another or can also be the same. The encryption methods BC1, BC2 can in particular be different from one another or can also be the same. The keys K1, K2 can in particular be different from one another or can also be the same.

Expediently, on multiple or all bus subscribers (e.g. SG6, SG7) the encryption device BC1 is the same and the encryption device BC2 is the same and the encryption methods BC1, BC1 are the same and the keys k1 are the same and the keys k2 are the same, in particular if symmetrical encryption is used; if asymmetrical encryption is used, on the other hand, then the encryption and decryption by all subscribers are expediently matched to one another.

Formulae for the receiving bus subscriber SG6 to clarify the encryption, decryption and authentication check can be e.g. the following:

$$CMAC1 = BC1(MSG, K1)$$

$$CYPH = CMAC \oplus CMAC1$$

$$RX\text{-}Count = BC2^{-1}(CYPH, K2)$$

Instead of the reference sign used for the freshness value "FV" when discussing more conventional methods according to FIG. 2-3, the reference sign "Count++" is used for the count in the description of exemplary embodiments according to the invention in order to differentiate.

E.g. a counter that increments with each transmission can be used to generate the count Count++, with e.g. a block length N that is equal to the length of the transmitted message authentication code CMAC1, e.g. N=4, BC1=AES, BC2=SIMECK an encrypted count CYPH.

Figure 5:
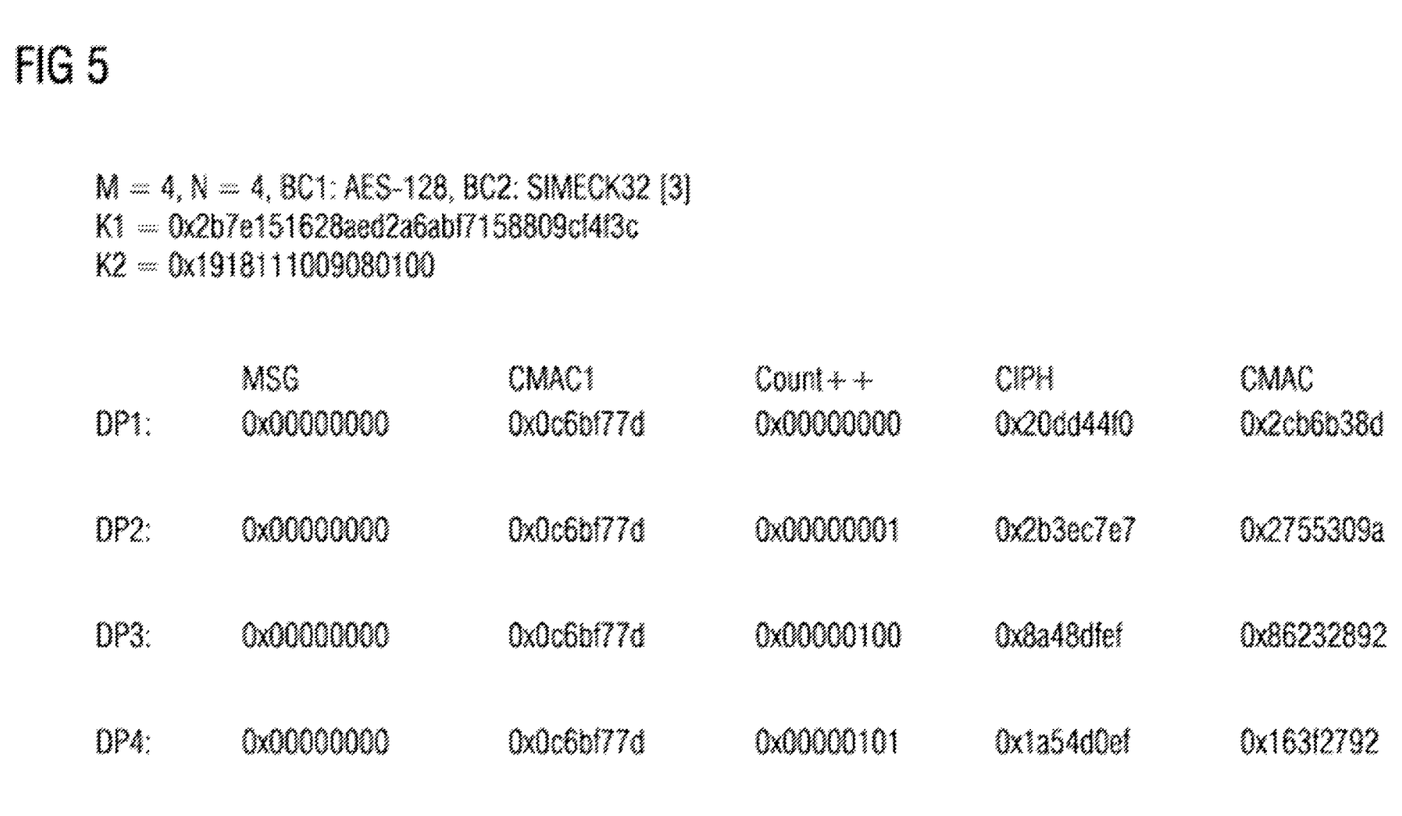
FIG. 5 shows, by way of example, values of messages and message authentication codes contained in each of four data packets, and also e.g. intermediate values of the calculations that are not transmitted in data packets, for an exemplary embodiment according to the invention.

FIG. 5 uses a table (copied here for the sake of simplicity) to show an example of what values the contained message MSG, the contained message authentication code CMAC, the encrypted message code CMAC1 (not contained in DP1), the count Count++(not contained in DP1) and the intermediate value CIPH (not contained in DP1) can have in each case in data packets DP1, DP2, DP3, DP4 in methods and/or apparatuses according to an exemplary embodiment according to the invention, e.g. according to FIG. 4:
M=4, N=4, BC1: AES-128, BC2 SIMECK32 [3]
K1=0x2b7e151628aed2a6abf7158809cf4f3c,
K2=0x1918111009080100,

| MSG | CMAC1 | Count | CIPH | CMAC |
|---|---|---|---|---|
| 0x00000000 | 0x0c6bf77d | 0x00000000 | 0x20dd44f0 | 0x2cb6b38d |
| 0x00000000 | 0x0c6bf77d | 0x00000001 | 0x2b3ec7e7 | 0x2755309a |
| 0x00000000 | 0x0c6bf77d | 0x00000100 | 0x8a48dfef | 0x86232892 |
| 0x00000000 | 0x0c6bf77d | 0x00000101 | 0x1a54d0ef | 0x163f2792 |

The example in FIG. 5 shows, for a constant message MSG=0, likewise constant CMAC1 values, as expected, but these are not transmitted. However, different CMAC values result from the change in the counter value (Count+++) of a message counter (on a transmitting bus subscriber SG7 for data packets DP1, DP2, DP3, DP4 transmitted by it (e.g. since the last bus reset and/or via the data bus etc.) and/or on a receiving bus subscriber SG6 for data packets DP1, DP2, DP3, DP4 received by it (e.g. since the last bus reset and/or via the data bus)) or a timer.

The CMAC values are transmitted; this effectively prevents replay attacks, and authenticity is ensured by the knowledge of the secret key in the sender and in the receiver. In contrast to the example in FIGS. 2 and 3 using a popular method, there is no truncation of the counter here, which means that no additional synchronization is necessary.

Due to the longer counter and CMAC values with the method according to the invention compared to the standard SecOC method, security against brute force attacks can be higher. Furthermore, a freely selectable tolerance S can be set in the receiver, which permits a tolerance to counter deviations on startup, for example so that a counter deviation of greater than 1 is permissible immediately after startup.

Another possible advantage is the possible saving of computing time with constant messages, which is often the case for automotive or IoT applications. The message-dependent CMAC1 can e.g. then be calculated in advance; the counter-dependent value CIPH is e.g. used with a lightweight block cipher method having lower runtime and resource requirements.

A customary standard CMAC algorithm BC1 is currently AES-128, which is supported in hardware in the case of larger controllers. Depending on the networks or on-ECU communication (LIN, CAN, CAN-FD, SPI, I2C) [1] used, various LW block cipher algorithms can be considered for the various PC; by way of illustration, algorithms from the SIMECK family [3] can be used here:

| µC | M | N | BC1 | BC2 |
|---|---|---|---|---|
| Classic CAN | 4 | 4 | AES | SIMECK32 (4 byte block support) |
| CAN-FD (1) | 8 | 4 | AES | SIMECK64 (8 byte block support) |
| CAN-FD (2) | 60 | 4 | AES | SIMECK64 |

Abbreviations used can e.g. have the following meanings:
BC block cipher algorithm
CAN, CAN-FD Controller Area Network, CAN Flexible Datarate
CMAC Cryptographic Message Authentication Code
Count "Freshness" counter
CYPH Ciphertext
HSM Hardware Security Module
LIN Lean Information Network
LW Lightweight
MSG Message
SecOC Secure Onboard Communication

The invention claimed is:

1. A method for checking of authentication at a bus subscriber of at least one data packet received via a bus system of a motor vehicle, the at least one data packet having been generated by before transmitting the at least one data packet containing a message to be included in the at least one data packet, at a bus subscriber configured to transmit the at least one data packet, generating a message authentication code to be included in the data packet, using a first encryption apparatus, the generating of the message authentication code comprising:
    generating an encrypted message code from the message using a first key and a first encryption method,
    generating an encrypted count from a count using a second key and a second encryption method, and
    generating using a logic operation the message authentication code to be transmitted from the encrypted message code and from the encrypted count;
the method comprising:
    receiving at least one data packet;
    generating an encrypted message code from the message contained in the received data packet using a first key and a first encryption method;
    generating an intermediate value from the transmitted message authentication code contained in the received data packet and from the generated encrypted message code using a logic device,
    generating a current received message count from the intermediate value using a decryption at a decryption device;
    comparing the current received message count with a preceding received message count determined for a data packet received before the data packet;

defining the received data packet as authenticated or as unauthenticated based on a difference between the current received message count and the preceding received message count.

2. The method as claimed in claim 1, wherein the count was either a value, generated using a counter, that
represented a number of messages transmitted and/or received via the bus system since the last restart of the bus system,
or a timer value, of at least one timer, available on multiple or all bus subscribers.

3. The method as claimed in claim 1, wherein the message authentication code to be transmitted was generated from the encrypted message code and from the encrypted count using a logic "Exclusive-Or" operation.

4. The method as claimed in claim 1, wherein the difference between the current received message count and the preceding received message count is a basis for defining the received data packet as authenticated or as unauthenticated
by regarding the received data packet as unauthenticated only if the difference is greater than one or greater than a threshold value,
the threshold value being set to a higher value after a restart of the bus system than in other normal operation.

5. The method as claimed in claim 1, wherein a logic Exclusive-Or operation is used to generate an intermediate value from the transmitted message authentication code also contained in the received data packet and from the generated encrypted message code using a logic device.

6. The method as claimed in claim 1, wherein a bus subscriber receiving a data packet and a bus subscriber transmitting a data packet use the same first encryption method and/or the same first key and/or the same second encryption method and/or the same second key.

7. The method as claimed in claim 1, wherein a bus subscriber receiving a data packet and a bus subscriber transmitting a data packet, derive the second key from the result of the first encryption method.

8. The method as claimed in claim 1, wherein a timer value representing time information relating to global time was securely distributed in a network from one subscriber to all other subscribers.

9. An apparatus for generating at least one data packet to be transmitted in a bus system a motor vehicle, the apparatus comprising:
a first encryption apparatus provided by a bus subscriber transmitting the data packet and configured to, before transmitting the at least one data packet,
generate a message authentication code to be included in the data packet to be transmitted, from the message to be included in the data packet,
wherein on the transmitting bus subscriber:
a first encryption device is configured to use a first encryption method to venerate an encrypted message code from the message by means of a first key,
a second encryption device configured to use a second encryption method to venerate an encrypted count from a count by means of a second key, and
a logic device is configured to generate the message authentication code from the encrypted message code and from the encrypted count using a logic operation;
the apparatus further configured to perform authentication checking of at least one data packet received via a bus system of a motor vehicle,
wherein on a bus subscriber receiving at least the data packet:
a first encryption device is configured to use a first encryption method to generate an encrypted message code from the message contained in the received data packet by means of a first key,
a logic device is configured to generate an intermediate value from the generated encrypted message code and from the message authentication code contained in the received data packet,
a decryption device is configured to determine a current received message count for a current data packet from the intermediate value,
a comparison apparatus is configured to define the received data packet as authenticated or as unauthenticated based on taking a difference between the current received message count and a preceding received message count determined for a data packet received before the data packet.

10. The apparatus as claimed in claim 9, wherein
the bus system is a CAN bus or a CAN FD bus or a LIN bus or an SPI bus or an I2C bus and/or is provided for communication between ECUs.

* * * * *